United States Patent

Matsushita

[19]

[11] Patent Number: 5,917,469
[45] Date of Patent: Jun. 29, 1999

[54] IMAGE POSITION ADJUSTING APPARATUS

[75] Inventor: Masahiro Matsushita, Kanagawa-ken, Japan

[73] Assignee: Fuji Photo Film Co., Ltd., Kanagawa-ken, Japan

[21] Appl. No.: 08/048,181

[22] Filed: Apr. 20, 1993

[30]    Foreign Application Priority Data

Apr. 20, 1992  [JP]  Japan .................................... 4-099989

[51] Int. Cl.[6] ..................................................... G09G 1/14
[52] U.S. Cl. .......................... 345/115; 345/437; 345/438
[58] Field of Search ................... 345/115, 112, 345/113, 118, 121, 126, 129, 130, 437, 438; 395/102, 137–139

[56]           References Cited

U.S. PATENT DOCUMENTS

| | | |
|---|---|---|
| 4,258,264 | 3/1981 | Kotera et al. . |
| 4,276,473 | 6/1981 | Kato et al. . |
| 4,315,318 | 2/1982 | Kato et al. . |
| 4,387,428 | 6/1983 | Ishida et al. . |
| 4,686,522 | 8/1987 | Hernandez et al. ..................... 345/146 |
| 4,710,875 | 12/1987 | Nakajima et al. . |
| 4,992,781 | 2/1991 | Iwasaki et al. .......................... 345/115 |
| 5,019,976 | 5/1991 | Chiu et al. ............................... 345/115 |
| 5,142,275 | 8/1992 | Rockel ..................................... 345/115 |

FOREIGN PATENT DOCUMENTS

| | | |
|---|---|---|
| 56-11395 | 2/1981 | Japan . |
| 61-5193 | 2/1986 | Japan . |

*Primary Examiner*—Amare Mengistu
*Attorney, Agent, or Firm*—Sughrue, Mion, Zinn, Macpeak & Seas, PLLC

[57]               ABSTRACT

An image position adjusting apparatus adjusts the position plurality of images such that the plurality of the images may overlap one upon another. An image display device reproduces the respective images from image signals, which represent the respective images, and displays the reproduced images. A transformation device transforms each of the images, which are displayed on the image display device, into a simple image. The simple image is represented by only the image signal components of the image signal representing each of the displayed images, which image signal components have signal values larger than a predetermined threshold value. A polygon display device displays an arbitrary polygon on each of the simple images. A shift device shifts the polygon displayed on each of the simple images. A deformation device deforms the polygon, which is displayed on one of the simple images, and deforms the polygons, which are displayed on the other simple images, so as to interlock with the deformation of the polygon, which is displayed on one of the simple images. A rotation device rotates the polygons, which are displayed on the other simple images.

12 Claims, 6 Drawing Sheets

IMAGE POSITION ADJUSTING APPARATUS

BACKGROUND OF THE INVENTION

1. Field of the Invention

This invention relates to an image position adjusting apparatus for adjusting the positions of a plurality of images such that the plurality of the images may overlap one upon another. This invention also relates to a method for using the image position adjusting apparatus.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal, and the electric signal (image signal) is processed and then used for reproducing the X-ray image as a visible image on a photocopy, or the like. In this manner, a visible image having good image quality with high contrast, high sharpness, high graininess, or the like, can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays, such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material, such as photographic film, on a display device, such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order for the desired image density to be obtained, an appropriate read-out gain is set when the emitted light is being detected and converted into an electric signal (image signal) to be used in the reproduction of a visible image on a recording material, such as photographic film, or on a display device, such as a CRT display device.

Bioimage analyzers are often used in order to carry out image analyses, or the like, by viewing radiation images of objects which have been obtained from stimulable phosphor sheets.

The bioimage analyzers are used in order to carry out image analyses, such as autoradiography on RNA, proteins, or the like, X-ray diffraction methods for analyzing protein structures, or the like, and drug metabolic analyses on animals and plants. If stimulable phosphor sheets are used for the bioimage analyzers, the aforesaid image analyses, and the like, can be carried accurately and quickly.

The bioimage analyzers may also be used in order to carry out drug metabolic analyses on brains of rats by displaying radiation images of brain slices of rats. In such cases, a plurality of brain slices, which have been immersed in drugs containing a radioisotope, are adhered to a stimulable phosphor sheet, and the stimulable phosphor sheet is thereby subjected to contact exposure to radiation, which is radiated out of the brain slices. The images of the brain slices which have been stored on the stimulable phosphor sheet, are read out. The images which have thus been read out are then compared with one another and, for example, differences in metabolism for different drugs are analyzed.

In such drug metabolic analyses on brain slices, superposition processing techniques, such as subtraction processing techniques or addition processing techniques, are often carried out on image signals representing a plurality of images to be compared with one another such that an image signal representing an image more suitable for analyses may be obtained.

With the subtraction processing techniques, an image is obtained which corresponds to a difference between a plurality of radiation images of an object recorded under different conditions. Specifically, a plurality of the radiation images recorded under different conditions are read out at predetermined sampling intervals, and a plurality of image signals thus detected are converted into digital image signals which represent the radiation images. The image signal components of the digital image signals which represent the image information recorded at corresponding sampling points in the radiation images are then subtracted from each other. A difference signal is thereby obtained which represents the image of a specific structure or part of the object represented by the radiation images.

With the addition processing techniques, the image signal components of the digital image signals which represent the image information recorded at corresponding sampling points in the radiation images are added to each other. Various kinds of noise in the image signals representing the radiation images are thereby decreased, and a signal is obtained which represents an image more suitable for analyses.

In order for the superposition processing techniques, such as the subtraction processing techniques, to be carried out, it is necessary to adjust the positions of the respective images such that the plurality of the images may overlap one upon another.

However, in cases where the drug metabolic analyses are carried out on brain slices of rats, brain slice images to be compared with one another are not necessarily obtained from the same brain slice. Therefore, the sizes and reference points of these images do not completely coincide with one another. Also, when the brain slices are adhered to the stimulable phosphor sheet, the brain slices become distorted. Additionally, the brain slices become enlarged or reduced due to drugs. Therefore, even if the brain slices are obtained from the same slicing plane, radiation images completely coinciding in sizes and shapes could not be obtained. For these reasons, during comparison and analyses of images of brain slices or images of animals or plants, it was difficult to adjust the positions of the images to be compared with one another such that the images might overlap one upon another.

Accordingly, various methods for adjusting the positions of images have been proposed. For example, in U.S. Pat. No. 4,710,875, a method has been proposed wherein images of markers are recorded together with each of radiation images of an object, and the positions of the images are adjusted with reference to the images of the markers. A method has also been proposed wherein the positions of images are adjusted by manually feeding parameters, which are necessary for the position adjustment, from a keyboard. Additionally, a method has been proposed wherein a plurality of arbitrary points are designated on radiation images, and parameters for carrying out the position adjustment are thereby determined.

However, with the method wherein markers are used, when images of an object are recorded, the markers must be located at positions such that the images of the markers may not become obstructions to the images of the object. Finding such a location is difficult for the operator who carries out the image recording operations.

With the method wherein the parameters necessary for the position adjustment are manually fed from the keyboard, the operator must input values of the parameters from the keyboard. This work is also difficult.

The method wherein a plurality of arbitrary points are designated on radiation images, and parameters for carrying out the position adjustment are thereby determined has the drawbacks described below. Specifically, for example, radiation images of brain slices, and the like, are very complicated. Therefore, when position adjustment has been carried out, it is very difficult to confirm whether or not the positions of the images have been adjusted accurately.

SUMMARY OF THE INVENTION

The primary object of the present invention is to provide an image position adjusting apparatus, with which the positions of images are adjusted easily and accurately.

Another object of the present invention is to provide a method for using the image position adjusting apparatus.

The present invention provides a first image position adjusting apparatus for adjusting the positions of a plurality of images such that the plurality of the images may overlap one upon another, comprising:

i) an image display means for reproducing the respective images from image signals, which represent the respective images, and displaying the reproduced images, ii) a transformation means for transforming each of the images, which are displayed on the image display means, into a simple image, the simple image being represented by only the image signal components of the image signal representing each of the displayed images which have signal values larger than a predetermined threshold value, iii) a polygon display means for displaying an arbitrary polygon on each of the simple images, iv) a shift means for shifting the polygon displayed on each of the simple images, v) a deformation means for deforming the polygon, which is displayed on one of the simple images, and deforming the polygons, which are displayed on the other simple images, so as to interlock with the deformation of the polygon, which is displayed on one of the simple images, and vi) a rotation means for rotating the polygons, which are displayed on the other simple images.

The present invention also provides a second image position adjusting apparatus, wherein the first image position adjusting apparatus in accordance with the present invention is modified such that it may further comprise a superposition display means for displaying an image when the polygons on the respective simple images overlap one upon another.

The present invention further provides a third image position adjusting apparatus, wherein the first or second image position adjusting apparatus in accordance with the present invention is modified such that it may further comprise an enlarging and reducing means for enlarging and/or reducing at least one of the polygons displayed on the respective simple images.

The present invention still further provides a fourth image position adjusting apparatus, wherein the first, second, or third image position adjusting apparatus in accordance with the present invention is modified such that it may further comprise a threshold value changing means for changing the threshold value.

The present invention also provides a method for using the first image position adjusting apparatus in accordance with the present invention, comprising the steps of:

i) displaying a plurality of images, the positions of which are to be adjusted, on the image display means, ii) transforming the plurality of the images into simple images by the transformation means, iii) displaying a triangle on each of the simple images by the polygon display means, iv) causing vertexes of the triangle, which is displayed on one of the simple images, to coincide with three arbitrary reference points on one of the simple images by the shift means and/or the deformation means, the triangles, which are displayed on the other simple images, being thereby deformed simultaneously, and v) causing vertexes of the triangle, which is displayed on each of the other simple images, to coincide with three reference points, which are located at corresponding positions on each of the simple images, by the shift means and/or the rotation means.

The term "reference point" as used herein means a comparatively perceptible point, which appears commonly on all of the simple images.

With the image position adjusting apparatus in accordance with the present invention, a plurality of images, the positions of which are to be adjusted, are displayed on the image display means. The plurality of the displayed images are transformed by the transformation means into simple images. Each of the simple images is represented by only the image signal components of the image signal representing each of the displayed images which have signal values larger than the predetermined threshold value. Therefore, even if the images, such as radiation images, the positions of which are to be adjusted, are complicated, the state in which the position adjustment is being carried out can be confirmed easily by viewing the simple images which are easy to see.

Also, with the image position adjusting apparatus in accordance with the present invention, after the displayed images are transformed into the simple images, a triangle is displayed on each of the simple images by the polygon display means. The polygon, which is displayed on one of the simple images, is deformed by the shift means and/or the deformation means such that the vertices of the polygon may coincide with the reference points on the simple image. Thereafter, the vertices of the polygon, which is displayed on each of the other simple images, is caused to coincide with the reference points, which are located at corresponding positions on each of the simple images, by the shift means and/or the rotation means. Therefore, numerals, and the like, need not be designated from a keyboard, or the like, and the adjustment of the positions of the images can be carried out easily by, for example, deforming the polygons.

In cases where the superposition display means is employed, the results of the image position adjustment can be confirmed easily.

In cases where the enlarging and reducing means for enlarging and/or reducing at least one of the polygons displayed on the respective simple images is employed, the accuracy, with which the vertexes of the polygon are caused to coincide with the reference points on the simple image, can be kept higher.

Further, in cases where the threshold value changing means is employed, the threshold value can be changed in accordance with the values of the image signal representing each image, and reference points which are more suitable for the position adjustment can thereby be found. Therefore, the accuracy, with which the position adjustment is carried out, can be kept higher.

DESCRIPTION OF THE PREFERRED EMBODIMENTS

The present invention will hereinbelow be described in further detail with reference to the accompanying drawings.

Figure 1:
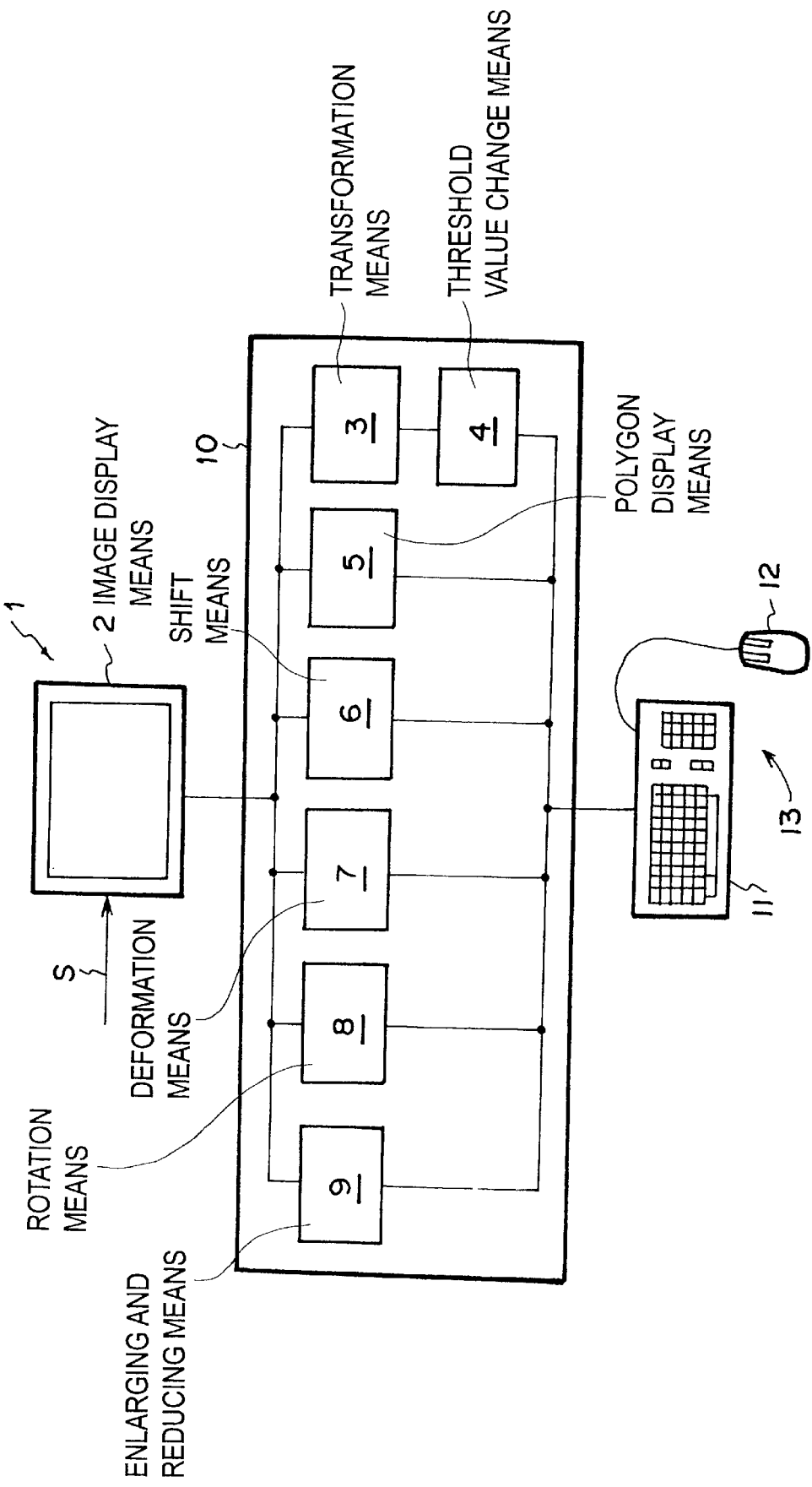
FIG. 1 is a schematic view showing an embodiment of the image position adjusting apparatus in accordance with the present invention.

FIG. 1 is a schematic view showing an embodiment of the image position adjusting apparatus in accordance with the present invention.

With reference to FIG. 1, an image position adjusting apparatus 1 comprises an image display means 2, a transformation means 3, a threshold value changing means 4, a polygon display means 5, a shift means 6, a deformation means 7, a rotation means 8, and an enlarging and reducing means 9. The image display means 2 reproduces a plurality of images, the positions of which are to be adjusted, from an image signal S and displays the reproduced images. The transformation means 3 transforms each of the images, which are displayed on the image display means 2, into a simple image. The simple image is represented by only the image signal components, of the image signal representing each of the displayed images, which image signal components have signal values larger than a predetermined threshold value. The threshold value changing means 4 is connected to the transformation means 3 in order to change the threshold value. The polygon display means 5 displays a triangle on each of the simple images. The shift means 6 shifts the triangle displayed on each of the simple images. The deformation means 7 deforms the triangle, which is displayed on one of the simple images. The deformation means 7 also deforms the triangles, which are displayed on the other simple images, so as to interlock with the deformation of the triangle, which is displayed on the aforesaid one of the simple images. The rotation means 8 rotates the triangles, which are displayed on the other simple images. Also, the enlarging and reducing means 9 carries out similar deformation (enlargement and/or reduction) of the triangles displayed on the other simple images. In the transformation means 3 employed in this embodiment, each image is transformed into a binary image by assigning a value of 1 to the image signal components, which have signal values larger than the threshold value, and assigning a value of 0 to the image signal components, which have signal values not larger than the threshold value. Thereafter, a contour and reference points of each image are detected by the method of four neighbors, and the image is thereby transformed into the simple image.

The transformation means 3, the threshold value changing means 4, the polygon display means 5, the shift means 6, the deformation means 7, the rotation means 8, and the enlarging and reducing means 9 are stored in a computer system 10. An input means 13, which comprises a keyboard 11 and a mouse cursor 12, is connected to the computer system 10. The function of each of the aforesaid means is executed on the image display means 2 in accordance with instructions fed from the input means 13.

How the images, the positions of which are to be adjusted by the image position adjusting apparatus 1, are obtained will be described hereinbelow. In this embodiment, the positions of images of rat brain slices are adjusted.

Figure 2:
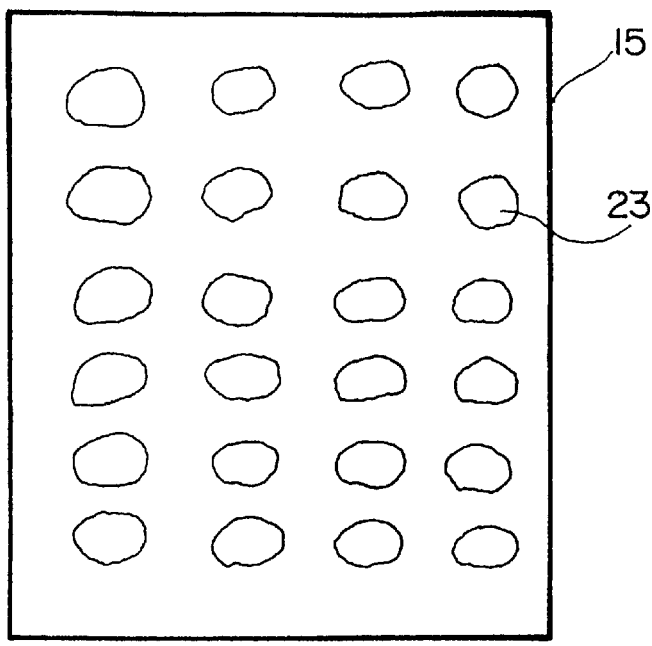
FIG. 2 is a schematic view showing a stimulable phosphor sheet to which brain slices of rats have been adhered.
Figure 3A:
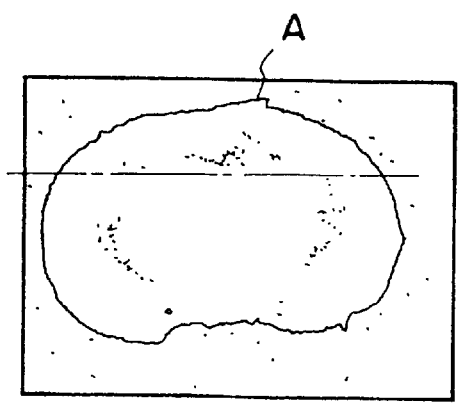
FIG. 3 is an explanatory view showing how original images are transformed into simple images.
Figure 3B:
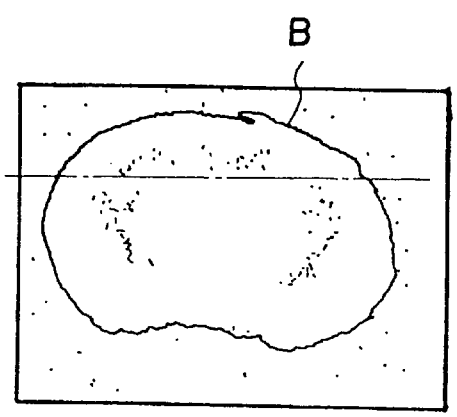
Figure 3C:
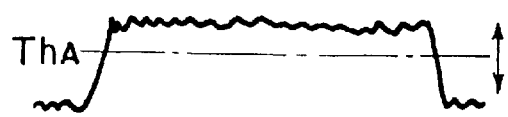
Figure 3D:
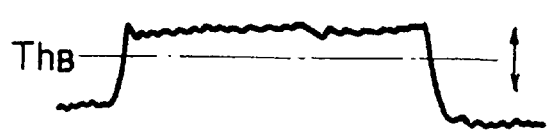

FIG. 2 is a schematic view showing a stimulable phosphor sheet to which brain slices of rats have been adhered.

As illustrated in FIG. 2, a plurality of brain slices 23, 23, . . . , which have been immersed in drugs containing a radioisotope, are adhered to a stimulable phosphor sheet 15. The stimulable phosphor sheet 15 is subjected to contact exposure to radiation, which is radiated out of the brain slices 23, 23, . . . The radiation images of the brain slices 23, 23, . . . are thereby stored on the stimulable phosphor sheet 15.

The radiation images, which have been stored on the stimulable phosphor sheet 15, are then read out by a read-out means (not shown). A digital image signal S representing the radiation images of the brain slices 23, 23, . . . is thereby obtained.

The image signal S is fed into the image position adjusting apparatus 1. In the image position adjusting apparatus 1, images of the brain slices 23, 23, . . . are reproduced from the image signal S and displayed on the image display means 2. By way of example, two images, the positions of which are to be adjusted, are selected from the plurality of the images of the brain slices 23, 23, . . . How the positions of the two images are adjusted will be described hereinbelow. Inputs to the respective means described below are given from the input means 13, which comprises the keyboard 11 and the mouse cursor 12.

Figure 4:
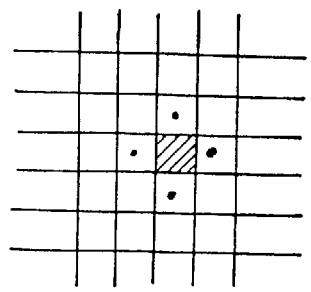
FIG. 4 is an explanatory view showing the method of four neighbors.

First, with the transformation means 3, each of the two images is transformed into a simple image. The simple image is represented by only the image signal components of the image signal representing each of the displayed images, which image signal components have signal values larger than the predetermined threshold value. Specifically, as illustrated in FIG. 3, image signal components, which correspond to predetermined positions on the two images and which have signal values larger than a predetermined threshold value Th, are detected. In this manner, only portions detected as contours of the images are displayed. In this embodiment, the two images are transformed into binary images by using predetermined threshold values ThA and ThB. Thereafter, with the method of four neighbors, the contour of the image of the brain slice 23 is detected, and comparatively perceptible points are detected as the reference points. As illustrated in FIG. 4, with the method of four neighbors, for a certain picture element in an image (i.e. the picture element hatched in FIG. 4), four picture elements surrounding the picture element (i.e. the four picture elements indicated by dots in FIG. 4) are compared with one another. In cases where the four picture elements are identical with one another, the corresponding portions are not extracted. In cases where the four picture elements are different from one another, the corresponding portions are extracted.

Figure 5A:
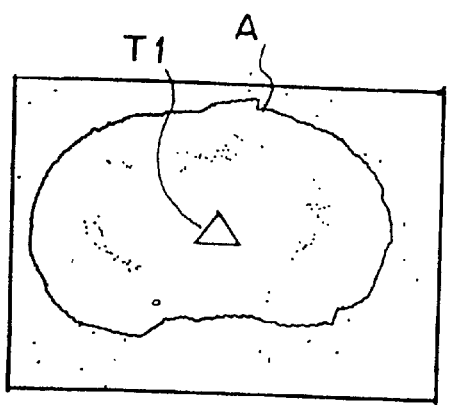
FIG. 5 is a schematic view showing simple images, on which triangles have been displayed.
Figure 5B:
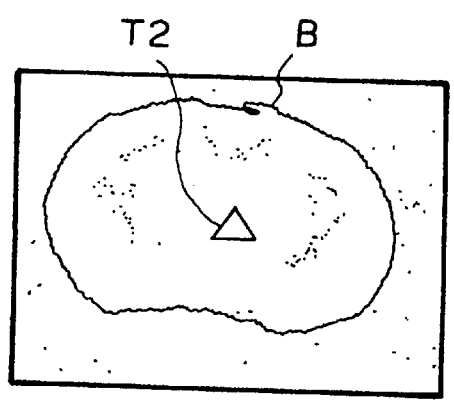

In the manner described above, two simple images A and B, which are composed of the contour lines and the reference points, are obtained from the transformation. As illustrated in FIG. 5, a triangle T1 and a triangle T2 are then respectively displayed on the simple images A and B by the polygon display means 5.

Figure 6A:
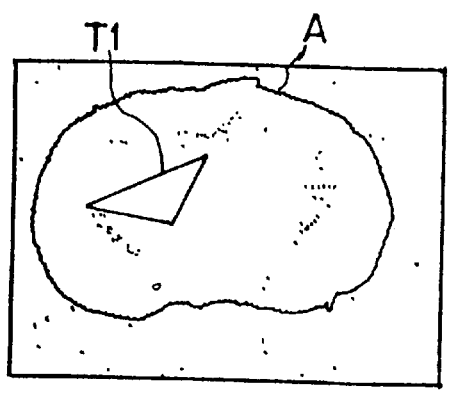
FIG. 6 is a schematic view showing simple images, on which the triangles have been shifted and deformed.
Figure 6B:
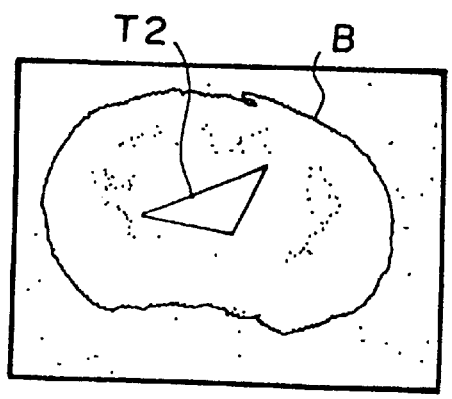

Thereafter, as illustrated in FIG. 6, The triangle T1 displayed on the simple image A is shifted and deformed by the shift means 6 and the deformation means 7 such that the vertexes of the triangle T1 may coincide with three arbitrary reference points on the simple image A. The deformation of the triangle by the deformation means 7 is carried out only on the triangle T1. The triangle T2 is also deformed so as to interlock with the deformation of the triangle T1, and therefore the triangle T1 and the triangle T2 are kept approximately identical with each other. The shifting and the deformation of the triangle T1 are carried out in the manner described below.

First, parameters for the shifting, the deformation, and the like, are determined as shown below.

|  | Simple image A | Simple image B | Common |
|---|---|---|---|
| Center of gravity of triangle | G | g |  |
| Center of gravity of image region | P | p |  |
| Vertex of triangle | $V_i$ (i = 1,2,3) | $v_i$ (i = 1,2,3) |  |
| Position parameter | OG | og |  |
| Vertex parameter | $GV_i$ (i = 1,2,3) | $gv_i$ (i = 1,2,3) |  |
| Rotation angle parameter |  |  | θ |
| Similitude ratio parameter |  |  | α |

The point O and the point o represent the left upper corner points of the respective image regions. The position parameter represents the position vector of the center of gravity of the triangle. The vertex parameter represents the position vector directed from the center of gravity of the triangle to a vertex i. Also, in these parameters, the coordinates of the center of gravity, the coordinates of the vertex, the position parameter, and the vertex parameter are processed as integer types of variables. The rotation angle parameter and the similitude ratio parameter are processed as double precision types of variables. The triangle T1 and the triangle T2 are always similar to each other, and therefore the following formula obtains.

$$gv_i(i=1,2,3) = \alpha \times \text{Rotate}(GV_i(i=1,2,3), \theta) \ldots \quad (1)$$

wherein α represents the similitude ratio parameter, and Rotate represents the rotation by the angle θ.

Figure 7:
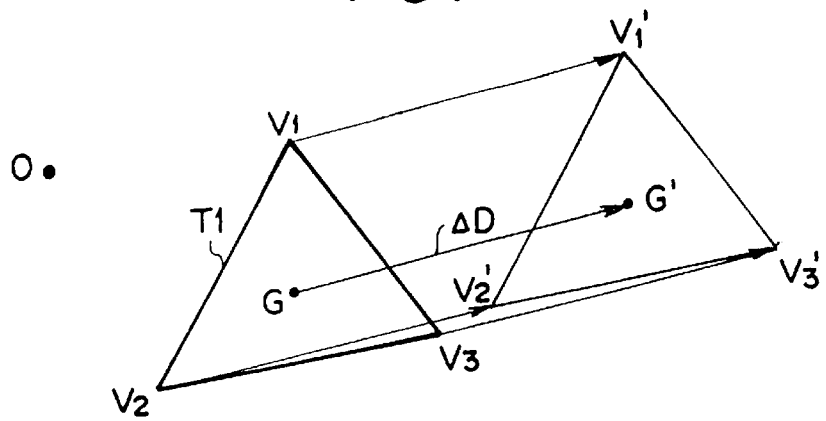
FIG. 7 is an explanatory view showing how a triangle is shifted.

The shifting of the triangle T1 is carried out by dragging a vertex of the triangle T1 by using the mouse cursor 12. As illustrated in FIG. 7, when the position of the triangle T1 shifts by a ΔD vector, all of the vertexes of the triangle T1 shift by the ΔD vector. Therefore, the formula $$OG' = OG + \Delta D \ldots \quad (2)$$

obtains, wherein G' represents the center of gravity of the triangle T1 after being shifted. The triangle T1 is shifted in accordance with Formula (2).

Figure 8:
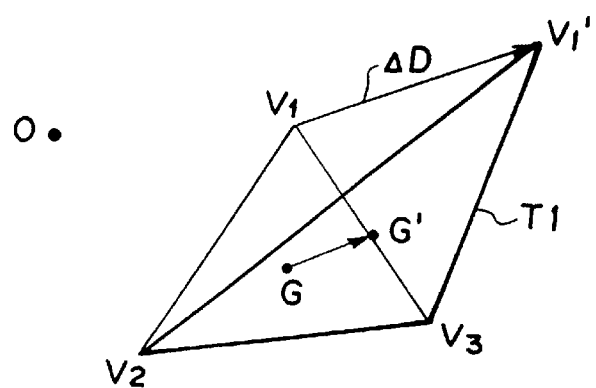
FIG. 8 is an explanatory view showing how a triangle is deformed.

The deformation of the triangle T1 is carried out by dragging a vertex of the triangle T1 by the mouse cursor 12. With this operation, only the dragged vertex shifts, and the triangle T1 is thereby deformed. The triangle T2 displayed on the simple image B is also deformed so as to interlock with the deformation of the triangle T1. As illustrated in FIG. 8, in cases where a vertex $V_i$ of the triangle T1 shifts to $V_i'$ and the vertex parameter $GV_i$ of the vertex i shifts by ΔD, the center of gravity G of the triangle T1 changes to the center of gravity G', and the position parameter changes from OG to OG'. In cases where a vertex 1 is dragged and shifted, the position parameter OG' is expressed as $$OG' = (GV_1' + GV_2 + GV_3)/3 + OG \ldots \quad (3)$$

Also, each vertex parameter changes to the position vector from the new center of gravity G'. Therefore, when the shifted vertex is rewritten as $V_i$, $GV_i(i=1,2,3)$ changes to $G'V_i(i=1,2,3)$, and the formula $$G'V_i(i=1,2,3) = GV_i(i=1,2,3) + G'G \ldots \quad (4)$$

obtains. At this time, the triangle T2 is deformed in the same manner. For example, as in the case of the triangle T1, when a vertex 1 is dragged and shifted, the formulas $$og'=(gv_1'+gv_2+gv_3)/3+og \ldots \quad (5)$$

$$g'v_i(i=1,2,3)=gv_i(i=1,2,3)+g'g \ldots \quad (6)$$

obtain.

In cases where the mouse cursor 12 indicates the position information in units of a picture element in the image, corrections are necessary for the points G' and g'. Specifically, $GV_i(i=1, 2, 3)$ always takes an integral value. However, when the center of gravity is determined, $GV_i(i=1,2,3)$ is divided by 3, and therefore the coordinate values become real values. For this reason, the corrections are required. In order for the corrections to be carried out, after the center of gravity is determined, the coordinate values of the center of gravity may be subjected to half-adjust for fractions below the decimal point and may thereby be transformed into integral-valued coordinates. However, in the case of the point g' on the simple image B, if the rotation and the real value-fold operation are carried out as in Formula (1), $g'v_i(i=1,2,3)$ does not take an integral value. Therefore, $g'v_i(i=1,2,3)$ may be converted into an integral value by half-adjust. However, in such cases, the relationship between the lengths of $G'V_i(i=1,2,3)$ and $g'v_i$ $(i=1,2,3)$ changes, and errors become perceptible during repeated processes. Therefore, in this embodiment, the operation expressed as Formula (1) is carried out by using real values up to the final process, and thereafter the resulting value is subjected to half-adjust during the image display. Also, in order for errors due to half-adjust, or the like, to be decreased, a calculation is made to find a deviation in position of a vertex, which has not been subjected to the shifting, or the like, before the processes were carried out and after the processes were carried out. The calculated deviation in position is added to the point g', and the correction is thereby carried out. For example, when the vertex 1 is dragged and shifted, the deviation in position of the vertex 2 is calculated by utilizing the formula $$ov_2=og+gv_2=og'+g'v_2 \quad (7)$$

and used during the correction. When necessary, the processes described above are carried out for each of the vertexes of the triangle T1, and the triangle T1 is thereby deformed.

During the shifting and the deformation of the triangle T1, if the reference points on the simple image A are imperceptible, as illustrated in FIG. 3, the threshold value Th may be changed by the threshold value changing means 4 such that desired reference points can be extracted.

After the vertexes of the triangle T1 have been caused to coincide with the reference points on the simple image A by carrying ou723 t the shifting and the deformation in the manner described above the shifting, rotation, and similar deformation of the triangle T2 are carried out by using the shift means 6, the rotation means 8, and the enlarging and reducing means 9. The rotation and the similar deformation of the triangle are carried out only on the triangle T2. The shifting, the rotation, and the similar deformation of the triangle T2 are carried out such that the vertexes of the triangle T2 may coincide with the corresponding reference points on the simple image B and the simple image A. Specifically, these processes are carried out in the manner described below.

In the same manner as that in the shifting of the triangle T1 described above, the shifting of the triangle T2 is carried out by dragging a vertex of the triangle T2 by using the mouse cursor 12. When the position of the triangle T2 shifts by a Δd vector, all of the vertexes of the triangle T2 shift by the Δd vector. Therefore, the formula $$og'=og+\Delta d \ldots \quad (8)$$

obtains, wherein g' represents the center of gravity of the triangle T2 after being shifted. The triangle T2 is shifted in accordance with Formula (8).

Figure 9:
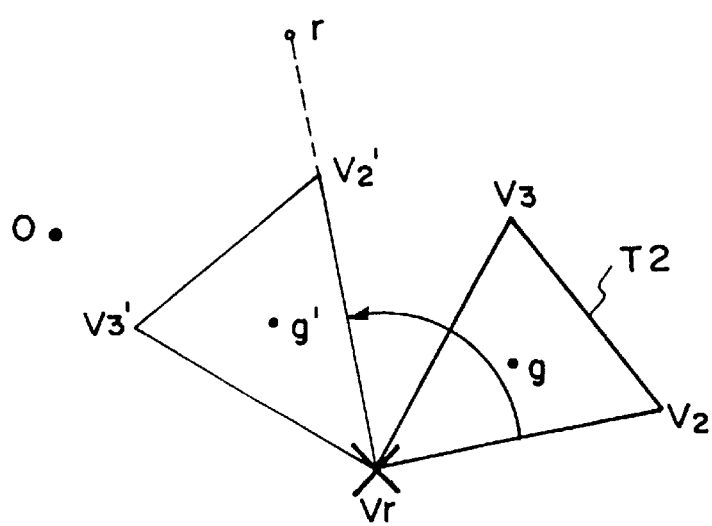
FIG. 9 is an explanatory view showing how a triangle is rotated.

The rotation of the triangle T2 is carried out with the mouse cursor 12 by clicking a vertex of the triangle T2, thereby designating the vertex serving as the center of rotation, and then dragging a different vertex of the triangle T2. In this embodiment, the counter-clockwise rotating direction around the center of rotation is taken as a positive direction of rotation. Also, the relative angle of rotation of the triangle T2 on the simple image B with respect to the triangle T1 on the simple image A is taken as the rotation angle parameter θ. As illustrated in FIG. 9, in cases where the triangle T2 has a certain rotation angle parameter $θ_0$, a vertex $v_r$ serving as the center of rotation is determined, a different vertex $v_i(i=r)$ is dragged, and the mouse position shifts to a point r. In such cases, the length of the side $v_rv_i$ of the triangle T2 does not change, and therefore the point $v_i'$ (i=r) after the triangle T2 has been rotated is expressed as $$gv_i'=gv_r+rv_i' \times |v_rv_i|/|rv_i'| \ldots \quad (9)$$

wherein $|v_rv_i|$ and $|rv_i'|$ respectively represent the magnitude of the vector $v_rv_i$ and the vector $rv_i'$. Also, the lengths of the three sides can be calculated from the triangle $rv_rv_i$, the magnitude of the angle of rotation $|Δθ|$ (=angle $rv_rv_i$) can be calculated in accordance with the cosine theorem. In this embodiment, the sign of $|Δθ|$ is determined by comparing the distance $|v_i''v_i'|$ between the point $v_i'$ and a shift point $v_i''$ of the vertex $v_i$ resulting from the rotation of the side $v_rv_i$ by an angle of $+|Δθ|$ around the vertex $v_r$ with the distance $|v_i''v_i'|$ between the point $v_i'$ and a shift point $v_i''$ of the vertex $v_i$ resulting from the rotation of the side $v_rv_i$ by an angle of $-|Δθ|$ around the vertex $v_r$. Specifically, in cases where the distance |vi"yi'| resulting from the rotation by the angle of $+|Δθ|$ is smaller than the distance resulting from the rotation by the angle of $-|Δθ|$, Δθ is taken as positive. In cases where the distance |vi"vi'| resulting from the rotation by the angle of $-|Δθ|$ is smaller than the distance resulting from the rotation by the angle of $+|Δθ|$, Δθ is taken as negative.

As in cases where the triangle T1 is deformed, if the mouse cursor 12 indicates the position information in units of a picture element in the image, corrections are necessary for the angle of rotation and the position of the triangle. Specifically, when the triangle T2 is rotated by a designated angle, the coordinates of the vertexes of the triangle T2 after being rotated take integral values due to half-adjust, and therefore errors occur with respect to the designated angle of rotation. In order for the errors to be eliminated, the angle of rotation of the triangle T2 is calculated in accordance with the position of the center of gravity of the triangle T2, which is displayed after being rotated. Specifically, if the position of the center of gravity of the triangle T2, which is displayed after being rotated, is represented by G", the angle G"$v_r$G in the triangle G"$v_r$G is calculated in accordance with the cosine theorem and is taken as the angle of rotation. At this time, the sign of the angle of rotation determined in the manner described above is used. The positions of the vertexes are corrected in the manner described below. Specifically, the vertex parameter, directed from the center of gravity G' of the triangle after being rotated to the vertex $v_r$ is identical with the vector resulting from the rotation of the vector $Gv_r$ by an angle of θ. Also, the position of the vertex $v_r$ does not change during the rotation. Therefore, a deviation in position of the vertex $v_r$ before the triangle was rotated and after the triangle was rotated is calculated and used during the correction. Specifically, the deviation in position of the vertex $v_r$ is calculated by utilizing the formulas $$ov_r = og + gv_r = og' + \text{Rotate}(GV_r, \theta_0) \ldots \quad (10)$$

and $$ov_r = og' + g'v_r = og' + \text{Rotate}(GV_r, \theta_0 + \Delta\theta) \ldots \quad (11)$$

and the correction is carried out by using the value of the deviation thus obtained.

Figure 10:
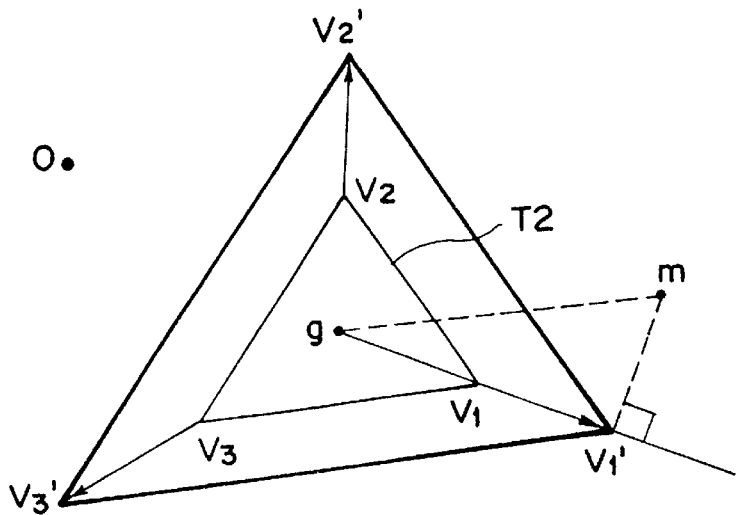
FIG. 10 is an explanatory view showing how a triangle is enlarged or reduced.

How the similar deformation is carried out on the triangle T2 will be described hereinbelow. In this embodiment, the similar deformation is carried out by dragging a vertex of the triangle T2 with the mouse cursor 12 and thereby enlarging or reducing the triangle T2. Also, in this embodiment, the ratio of the size of the triangle T2 to the size of the triangle T1 is taken as the similitude ratio parameter $\alpha$. As illustrated in FIG. 10, in cases where the vertex $v_1$ of the triangle T2 is dragged and shifted to a point m by using the mouse cursor 12, a new vertex $v_1'$ is taken at the position, at which the foot of the perpendicular from the point m to the extension of the $gv_i$ vector is located. In such cases, the similitude ratio parameter $\alpha$ is calculated with the formula $$\alpha = |gv_1'|/|GV_1| \ldots \quad (12)$$

In accordance with the similitude ratio parameter $\alpha$ calculated with Formula (12), the positions of new vertexes $v_2'$ and $v_3'$ respectively corresponding to the other vertexes $v_2$ and $v_3$ are calculated with Formula (1).

The triangle T1 and the triangle T2 are deformed such that they may be approximately identical with each other. Therefore, the enlargement and reduction of the triangle T2 by the enlarging and reducing means 9 are carried out to an extent such that errors occurring during the processes may be eliminated. In cases where the sizes of the triangle T1 and the triangle T2 are identical with each other, the enlargement and the reduction need not be carried out.

Figure 11A:
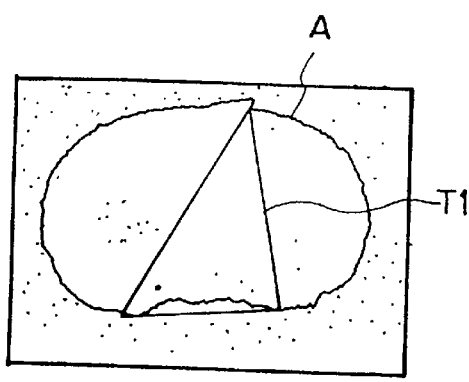
FIG. 11 is a schematic view showing simple images, on which the vertexes of triangles coincide with reference points.
Figure 11B:
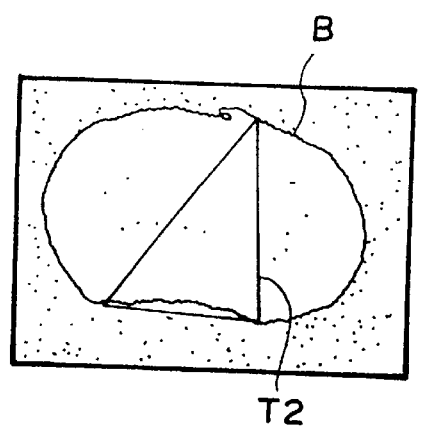

FIG. 11 shows the triangle T1 and the triangle T2, which have been subjected to the shifting, the deformation, the rotation, and the enlargement and reduction. In this state, the vertexes of the triangle T1 and the triangle T2 coincide with the three reference points, which are located at corresponding positions on the simple image A and the simple image B.

The respective parameters of the triangle T1 and the triangle T2 are determined in the manner described above. Thereafter, the image position adjustment is carried out in the manner described below by superposing the simple image A and the simple image B one upon the other.

Figure 12:
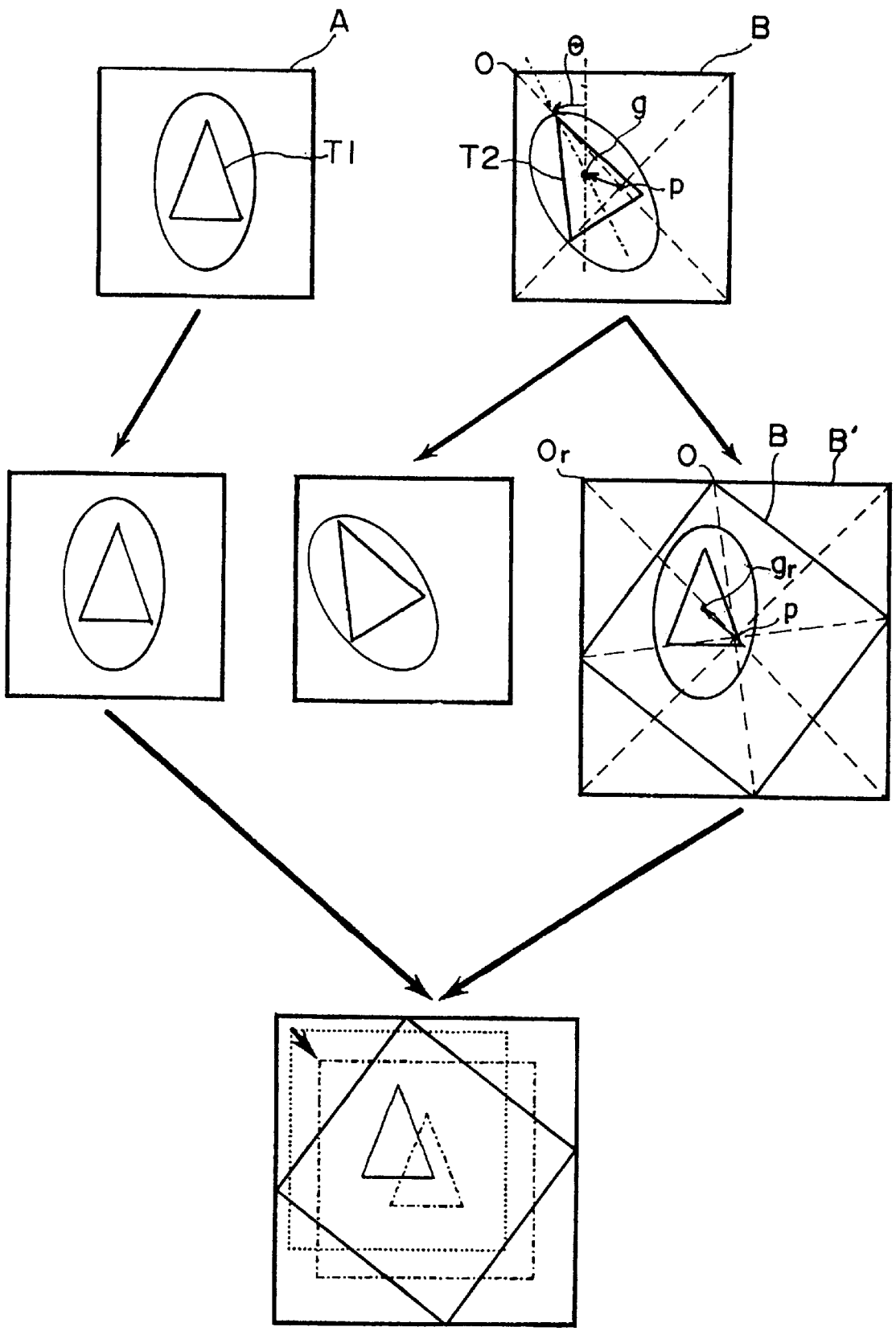
FIG. 12 is an explanatory view showing how two simple images are superposed one upon the other.

As illustrated in FIG. 12, the simple image B is rotated. In this embodiment, the center of rotation is set at the center of gravity p of the image region of the simple image B (i.e. at the point of intersection between the diagonal lines of the window on the side of the simple image B shown in FIG. 3, 5, 6, or 11). The position vector pg directed from the center of gravity p to the center of gravity g of the triangle T2 on the simple image B is calculated and rotated by an angle of $-\theta$ around the center of gravity p. The point, to which the center of gravity g of the triangle T2 moves during the rotation by the angle of $-\theta$ around the center of gravity p of the window, is taken as $g_r$. When the simple image B is rotated, the sides of the window, in which the simple image B is displayed, become not parallel to the corresponding sides of the image display window of the image display means 2. In such cases, the subsequent superposing process will become complicated. Therefore, in order to avoid such problems, a square region B' is determined which has a minimum size containing the window in which the rotated simple image B is displayed. The center of gravity of the square region B' coincides with the center of gravity p of the window in which the simple image B before being rotated is displayed. Also, the left upper corner point $o_r$ of the square region B' is taken as a reference point for the position parameter of the triangle. Specifically, the position parameter $o_r g_r$ of the triangle T2, which has been rotated, in the square region B' is expressed as $$o_r g_r = o_r p + p g_r \ldots \quad (13)$$

With the operations described above, the deviation in position due to the triangle T1 and the triangle T2 having the angles of rotation can be eliminated. The rotation of the image can be carried out by utilizing an ordinary rotation matrix.

Thereafter, the difference $\Delta$ between the position parameters of the triangle T1 and the triangle T2 is calculated with the formula $$\Delta = o_r g_r - og \ldots \quad (14)$$

Figure 13:
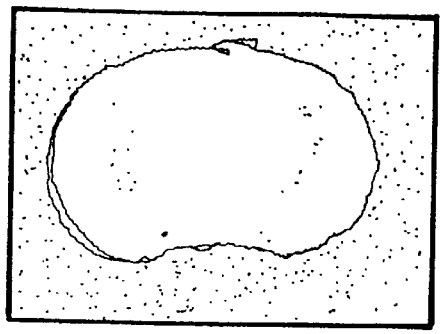
FIG. 13 is a schematic view showing the results of position adjustment carried out such that two simple images may overlap one upon the other.

The simple image B is shifted by the thus calculated value and superposed upon the simple image A. In this manner, as illustrated in FIG. 13, the superposition of the two simple images A and B is completed.

The simple images A and B may be directly superposed one upon the other, and the results of the position adjustment may be investigated. Alternatively, a subtraction process, an addition process (i.e. the addition of image signal components representing the corresponding picture elements in the two images), a multiplication process, a division process, and the like, may be carried out simultaneously with the superposition of the images, and an image obtained from such a process may be displayed.

In the embodiment described above, in cases where the reference points on the image are imperceptible, the image is set in the state shown in FIG. 3, and the threshold value is changed when the triangle on the simple image A is deformed. Such an operation may be carried out at any stage of the processes. In the image position adjusting apparatus in accordance with the present invention, the display may be returned to the state shown in FIG. 3 from any of the processes for the shifting, the deformation, the rotation, and the enlargement and reduction of the triangle, and the threshold value may be changed such that desired reference points can be extracted.

Also, in the aforesaid embodiment, the threshold value used during the transformation of the original image into the simple image is changed by using the threshold value changing means such that the reference points more suitable for the position adjustment can be extracted. However, the threshold value changing means need not necessarily be provided, and the threshold value may be kept the same during the transformation of the original image into the simple image.

Additionally, in the aforesaid embodiment, two images are selected for the position adjustment from a plurality of the radiation images of the brain slices, which images have been reproduced from the images stored on a single stimulable phosphor sheet. Alternatively, the images, the positions of which are to be adjusted, may be selected from radiation images, which have been reproduced from images having been stored on different stimulable phosphor sheets.

Further, in the aforesaid embodiment, the positions of two images are adjusted. Alternatively, the positions of three or more images may be adjusted.

Moreover, in the embodiment described above, the positions of the radiation images of rat brain slices are adjusted. The image position adjusting apparatus in accordance with the present invention is also applicable when the positions of other kinds of images are to be adjusted.

Finally, in the embodiment described above, triangles are used as the polygons during the adjustment of the positions of two simple images. Alternatively, any of other polygons, e.g. squares, may be employed.

What is claimed is:

1. An image position adjusting apparatus for adjusting the positions of a plurality of images such that the plurality of the images may overlap one upon another, comprising:
   i) an image display means for reproducing the respective images from image signals, which represent the respective images, and displaying the reproduced images,
   ii) a transformation means for transforming each of the images, which are displayed on said image display means, into a simple image, said simple image being represented by only the image signal components of the corresponding image signal which have signal values larger than a predetermined threshold value,
   iii) a polygon display means for displaying an arbitrary polygon on each of said simple images,
   iv) a shift means for shifting the polygon displayed on each of said simple images,
   v) a deformation means for deforming the polygon, which is displayed on one of said simple images, and deforming the polygons, which are displayed on the other simple images, so as to interlock with the deformation of said polygon, which is displayed on said one of said simple images, and
   vi) a rotation means for rotating the polygons, which are displayed on said other simple images.

2. An apparatus as defined in claim 1 further comprising a superposition display means for displaying such that the polygons on the respective simple images may overlap one upon another.

3. An apparatus as defined in claim 2 further comprising an enlarging and reducing means for enlarging and/or reducing at least one of the polygons displayed on the respective simple images.

4. An apparatus as defined in claim 1, 2, or 3 further comprising a threshold value changing means for changing the threshold value.

5. An apparatus as defined in claim 1 further comprising an enlarging and reducing means for enlarging and/or reducing at least one of the polygons displayed on the respective simple images.

6. An apparatus as defined in claim 1 wherein each of the image signals has been obtained by reading out a radiation formed by radiation.

7. An apparatus as defined in claim 6 wherein said radiation image has been stored on a stimulable phosphor sheet.

8. An apparatus as defined in claim 6 wherein said radiation image has been recorded on photographic film.

9. A method for adjusting image positions comprising the steps of:
   i) displaying a plurality of images, based on image signals, the positions of which are to be adjusted,
   ii) transforming each of the plurality of the images into simple images, said simple images being represented by image components of a corresponding image which have signal values larger than a predetermined threshold value,
   iii) displaying a triangle on each of said simple images,
   iv) causing vertices of the triangle, which is displayed on one of said simple images, to coincide with three arbitrary reference points on said one of said simple images by at least one of linearly shifting and deforming the triangle, and causing the triangles, which are displayed on the other simple images, to be thereby deformed simultaneously, and
   v) causing vertices of the triangle, which is displayed on each of said other simple images, to coincide with three reference points, which are located at corresponding positions on each of said simple images, by at least one of linearly shifting and rotating the triangles.

10. A method as defined in claim 9 wherein each of the images, the positions of which are to be adjusted, is reproduced from an image signal detected by reading out a radiation image formed by radiation.

11. A method as defined in claim 10 wherein said radiation image has been stored on a stimulable phosphor sheet.

12. A method as defined in claim 10 wherein said radiation image has been recorded on photographic film.

* * * * *